United States Patent [19]

Kaneko et al.

[11] Patent Number: 4,821,381
[45] Date of Patent: Apr. 18, 1989

[54] FASTENER MADE OF SYNTHETIC RESIN

[75] Inventors: Yoshio Kaneko; Kunihiro Fukuhara; Koji Watanabe, all of Yokohama, Japan

[73] Assignee: Nifco, Inc., Yokohama, Japan

[21] Appl. No.: 149,306

[22] Filed: Jan. 28, 1988

[30] Foreign Application Priority Data

Jan. 30, 1987 [JP] Japan .............. 62-11460[U]

[51] Int. Cl.⁴ ............................................. F16B 13/04
[52] U.S. Cl. ........................................ 24/297; 24/453; 411/41
[58] Field of Search ............. 24/297, 289, 587, 453, 24/563, 573; 411/48, 41, 45, 377, 39, 40, 46

[56] References Cited

U.S. PATENT DOCUMENTS

| 3,313,083 | 4/1967 | Flora | 411/38 |
| 3,918,130 | 11/1975 | Poe | 24/297 |
| 4,276,806 | 7/1981 | Morel | 411/46 |
| 4,405,272 | 9/1983 | Wollar | 411/41 |
| 4,407,618 | 10/1983 | Kimura | 411/48 |
| 4,728,068 | 3/1988 | Rivkin | 24/453 |

FOREIGN PATENT DOCUMENTS

| 248728 | 4/1963 | Australia | 411/46 |
| 786862 | 11/1957 | United Kingdom | 411/45 |

Primary Examiner—Victor N. Sakran
Attorney, Agent, or Firm—Schwartz & Weinrieb

[57] ABSTRACT

A fastener made of synthetic resin is molded such that a leg portion of an insertion pin is integrally formed midway of its length with a wide diameter portion for widening a bush, and the bush is fitted on a part of the leg portion under the wide diameter portion. The leg portion is provided with two, axially separated engagement notches for engagement with a lower end inner diameter portion of the bush whereby the insertion pin is initially held at a first pre-assembled position within the bush and a second, final-assembled position within the bush.

13 Claims, 2 Drawing Sheets

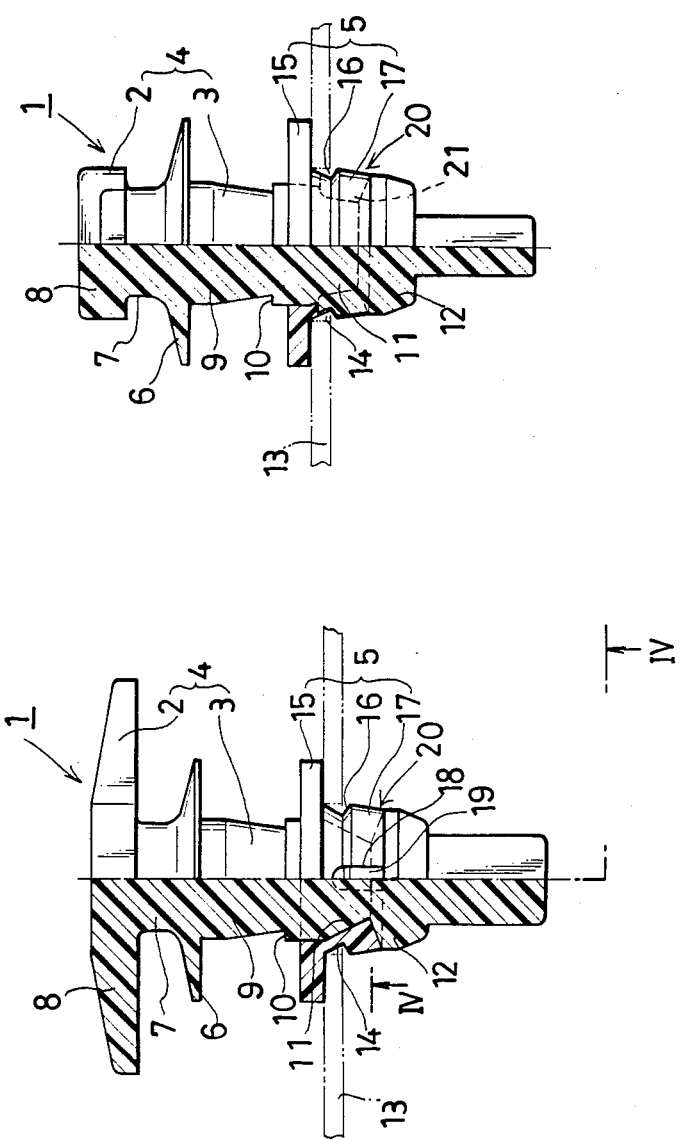

FASTENER MADE OF SYNTHETIC RESIN

FIELD OF THE INVENTION

This invention relates to a fastener for fastening various component parts to a support panel, and more particularly to a fastener made of synthetic resin suitable for fastening a weather strip around a door of an automotive vehicle or to the edge of an opening of a trunk thereof.

DESCRIPTION OF THE PRIOR ART

A conventional fastener of this type comprises an insertion pin made from a hard resin and is integrally provided with a head portion and a leg portion depending from the head portion, and a bush made from a soft resin and having a cylindrical portion to be fitted onto the outer periphery of the leg portion of the insertion pin and integrally provided upon the upper end thereof with a flange portion having a larger diameter than the inner diameter of a hole formed within the support panel (Japanese patent publication No. SHO 48(1973)-25462).

However, in the conventional fastener, since the insertion pin and bush are separately formed, the cylindrical portion of the bush must, at the time of mounting it into the panel, first be forcibly pushed into the hole formed within the panel so as to secure the same therein and then, the insertion pin must be inserted into the hollow interior of the cylindrical portion of the bush. Therefore, the mounting operation is time-consuming and troublesome.

In some instances, it is desired to use the fastener within a metallic panel having a coating deposited thereon for rust prevention purposes. With the conventional fastener, since the bush is spread widely from the beginning of the mounting operation, it sometimes scratches or peels off the coating, or the like, around the hole when it is inserted into the hole. Rusting is therefore apt to begin to occur at such sites or locations.

OBJECT OF THE INVENTION

The object of the present invention is to provide a fastener made of synthetic resin material which can be easily and simply mounted within a hole defined within a support panel and which is convenient and easy to operate.

SUMMARY OF THE INVENTION

To achieve the above-mentioned object, a fastener according to the present invention comprises an insertion pin made from a hard resin material integrally provided with a head portion and a leg portion depending from the head portion, and a bush made from a soft resin material integrally provided with a cylindrical portion to be fitted onto an outer peripheral portion of the leg portion of the insertion pin and a flange portion having a diameter larger than the inner diameter of a mounting hole defined within a support panel and disposed at an upper end of the cylindrical portion, wherein the leg portion of the insertion pin is provided midway along the length thereof with a wide diameter portion for diametrically enlarging the bush, the bush is molded in such a way as to be in engagement with a lower part of the wide diameter portion of the leg portion, and the outer diameter of the cylindrical portion of the molded bush is made smaller than the inner diameter of the mounting hole defined within the support panel.

This structural arrangement enables the fastener of the present invention to be easily inserted into a mounting hole defined within a support panel with the insertion pin already fitted into the bush. In this way, when the fastener is inserted into the hole defined within the support panel until the flange portion of the bush abuts against the upper surface of the panel, the leg portion of the insertion pin is strongly pushed into the bush. As a result, the wide diameter portion of the insertion pin leg portion is forced into the bush so as to widen the diameter of the cylindrical portion of the bush. Thus the panel is vertically sandwiched between the cylindrical portion of the bush and the flange portion of the bush. As a result, the insertion pin is retained within the mounting hole of the support panel through means of the operative cooperation defined between the cylindrical portion of the bush and the wide diameter portion of the insertion pin.

In this way, the fastener can be easily mounted without scratching the panel surface.

BRIEF DESCRIPTION OF THE DRAWINGS

The above and other objects and features of the invention will become more apparent from the following detailed description with reference to the accompanying drawings, wherein:

FIG. 1 is a front view of a fastener according to one embodiment of the present invention, half of which is shown in section;

FIG. 2 is a side view of the fastener of FIG. 1, half of which is shown in section;

DETAILED DESCRIPTION OF THE PREFERRED EMBODIMENT

Figure 5:
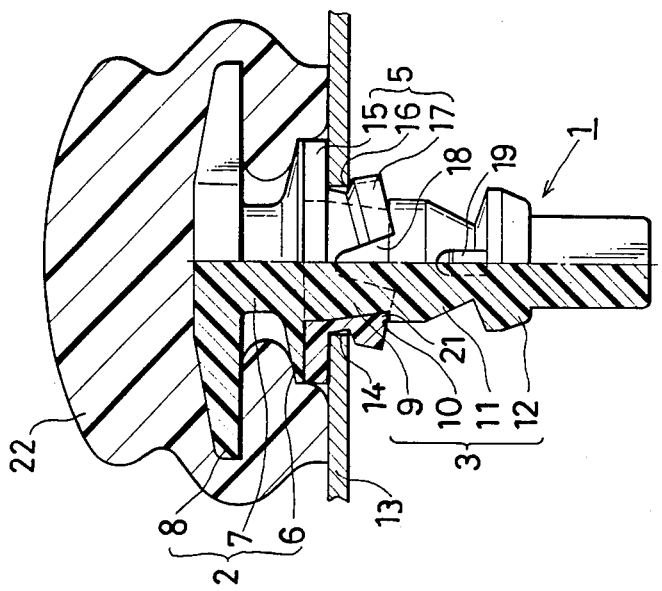
FIG. 5 is a front view, partially in section of the fastener of FIG. 1 in use.

The accompanying drawings illustrate one embodiment of a fastener according to the present invention and as initially shown in FIG. 5, although there is shown an embodiment in which a weather strip 22 is retained upon a support panel 13 by means of the fastener 1, the fastener according to the present invention is not limited to use with a weather strip but can also be used for fastening various other components to a support panel.

As shown in FIGS. 1 and 2, the fastener 1 comprises an insertion pin 4 having a head portion 2 and a leg portion 3 depending from the head portion 2, and a cylindrical bush 5 which is fitted upon the outer periphery of the leg portion 3 of the insertion pin 4. The insertion pin 4 is integrally made from a comparatively hard resin material having suitable rigidity, while the bush 5 is integrally made from a comparatively soft resin material having suitable elasticity.

Figure 3:
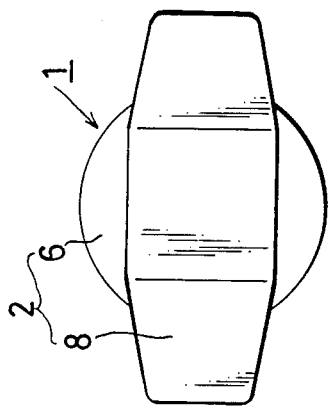
FIG. 3 is a plan view of the fastener of FIG. 1.
Figure 4:
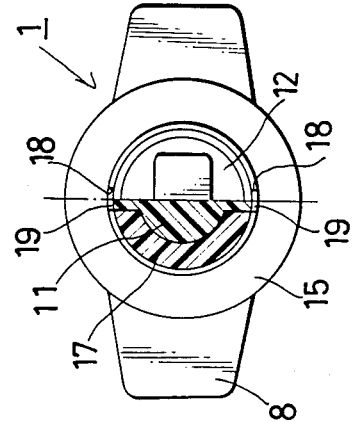
FIG. 4 is a bottom view, partially sectioned along line IV—IV in FIG. 1, of the fastener.

As shown in FIGS. 1 through 3, the head portion 2 of the insertion pin 4 comprises a dish-shaped flange portion 6, a cylindrical intermediate shaft portion 7 extending for a short length upwardly from the center of the upper surface of the flange portion 6, and a plate-like push portion 8 laterally extending from the upper end of the intermediate shaft portion 7.

The leg portion 3 of the insertion pin 4 extends downwardly from the center of the undersurface of the flange portion 6. The leg portion 3 is further provided with a wide diameter portion 9 disposed immediately under the flange portion 6 for expanding the diametrical extent of the bush 5. Below the wide diameter portion 9, the leg portion 3 is further provided with a stepped or flanged/shoulder portion 10 projecting outwardly in the radial direction from a part thereof for engaging the lowermost end portion of the bush 5, a reduced diameter portion 11 which tapers radially inwardly as one proceeds axially downwardly as viewed in the figures, formed under the stepped portion 10 and engaged with the bush 5, and a projecting portion 12 and projecting radially outwardly trapezoidal sectional shape from below the reduced diameter portion 11.

On the other hand, the bush 5 is provided at an upper end thereof with a flange portion 15 having a diameter larger than the diameter of a hole 14 formed within a support panel 13 for permitting the bush 5 to be supported upon the upper surface of the panel 13 when the body of the bush is inserted through the hole or aperture 14, an indented portion 16 formed under the flange portion 15 and disposed within the vicinity of the aperture 14 within panel 13, and capable of being expanded so that its diameter becomes generally the same as the diameter of the hole 14, and a large diameter portion 17 continuously formed under the indented portion 16 and capable of being radially expanded so that its diameter becomes larger than that of the hole 14. As shown in FIG. 5, the bush 5 is further formed with a pair of slits 18 extending from a lower end of the large diameter portion 17 up to the indented portion 16, so that the large diameter portion 17 can be radially expanded by opening of the slits 18.

In the illustrated embodiment, two opposed slits 18 are provided. Alternatively, slits may be provided at four places. Furthermore, a pair of ribs 19 projecting from the outer peripheral surface of the leg portion within the vicinity of the projecting portion 12 and being fitted within the slits 18 when the fastener is disposed in its initial state as seen in FIG. 1 are produced during molding. However, these ribs 19 are not essential and can be omitted.

In forming the fastener 1 having the above-mentioned construction, the insertion pin 4 and bush 5 are integrally molded by means of the known double-shot molding method. More specifically, the insertion pin 4 is formed by means of a primary molding process using a hard resin material. The reduced diameter portion 11 of the leg portion 3 molded by means of the primary molding process is disposed within a mold and the bush 5 is formed by means of a secondary molding process using a soft resin material. When the insertion pin 4 and bush 5 are integrally molded in this way, the inner peripheral surface of the bush 5 is formed along the outer peripheral surface of the reduced diameter portion 11, the portion below the flange portion 15 narrows radially inwardly and downwardly and the large diameter portion 17 of the bush is formed with a downwardly tapered outer surface 20 which substantially continues into the outer peripheral surface of the projecting portion 12 of the insertion pin.

The steps for using the fastener 1 in order to secure a component to the support panel 13 will be described next. As shown in FIGS. 1 and 2, the panel 13 is formed beforehand with a hole 14 having generally the same diameter as the inner diameter of the indented portion 16 of the bush 5.

Then, the fastener 1 is secured to a weather strip 22. That is, as shown in FIG. 5, the push portion 8 of the head portion 2 of the insertion pin 4 is forced into the weather strip 22 so as to be securely embedded therein.

After the push portion 8 of the insertion pin 4 has been secured to the weather strip 22, the tip of the leg portion 3 is held in alignment with the hole 14 and inserted therein.

More specifically, when the leg portion 3 is inserted into the hole 14, the tapered surface 20 of the large diameter portion 17 of the bush 5 is disposed in slidable contact with the peripheral edge of the hole 14 and the large diameter portion 17 is permitted to smoothly pass through the hole 14 without difficulty. When the undersurface of the flange portion 15 abuts against the upper edge of the hole 14 and the upper surface of the support panel 13, the bush 5 is prevented from further penetration into hole 14 and relative to panel 13.

Then the leg portion 3 is strongly pushed into the bush 5 from the above-mentioned position. Upon axially downward movement of the leg portion 3, the wide diameter portion 9 progresses into the interior of the bush 5. When the inner peripheral surface of the bush 5 has been moved relative to insertion pin 4 and over the wide diameter portion 9 thereof, the portion of the bush 5 below the flange portion 15, that is, the large diameter portion having the slits 18, is radially expanded in the lateral direction as a result of the opening of the slits 18.

When the leg portion 3 is pushed into the bushing still further, the wide diameter portion 9 of the insertion pin passes through the large diameter portion 17 of the bush 5 and, as a result, the bush 5 is slightly reduced in diameter by means of the elastic restoring force thereof. When the diameter of the bush 5 decreases in this way, the lower end portion of the opening of the large diameter portion 17 thereof, that is an angle portion 21, engages with the stepped portion 10 of the leg portion 3 in a snap-fit manner. At this time, the worker experiences a clicking sensation.

Furthermore, almost simultaneously with the production of the click, the undersurface of the flange portion 6 of the insertion pin 4 abuts against the upper surface of the flange portion 15 of the bush and the leg portion 3 is unable to be pushed into the bush any further.

In this way, upon insertion of the insertion pin 4, the portion of the bush 5 disposed beneath the flange portion 15 is widened in the diametrical direction by means of the wide diameter portion 9 of the leg portion 3, and the edge of the hole 14 is fitted within the indented portion 16. At the same time, the panel 13 is vertically sandwiched and held between the undersurface of the flange portion 15 and the upper surface of the large diameter portion 17. On the other hand, since the angle portion 21 at the lower end of the opening of the bush 5 becomes engaged with the stepped portion 10 of the leg portion 3, the leg portion 3 is effectively prevented from becoming disengaged from the bush 5 (FIG. 5).

Therefore, the insertion pin 4 is retained in the hole 14 of the panel 13 by means of the bush 5. At the same time, the weather strip 22 is secured to the panel 13 along the upper surface thereof.

In the illustrated embodiment, the outer diameter of the largest portion of the large diameter portion 17 of the bush 5 is set to be generally the same as the diameter of the hole 14 formed within the panel 13. Alternatively, it can of course be made smaller. Although the bush 5 is formed with the indented portion 16 and the large diameter portion 17 below the flange portion 15, the outer peripheral surface thereof may alternatively be formed so as to have a simple cylindrical shape. If the outer peripheral surface is formed so as to have a cylindrical shape, it is preferable that the inner peripheral surface be formed with an internal projection for engaging the wide diameter portion 9 of the leg portion 3 of the insertion pin 4, so that the outer peripheral surface of the bush 5 can nevertheless tightly engage the panel 13 within the vicinity of the aperture 14 as a result of the internal projection engaging the wide diameter portion 9 of the pin 4. Furthermore, although the bush 5 is provided at the lower end portion thereof with a pair of slits 18 extending up to the indented portion 16, the number of slits 18 and the length thereof are not limited to those in the embodiment. Moreover, the slits 18 are not absolutely essential and may be omitted.

On the other hand as seen, in the illustrated embodiment the insertion pin 4 has an outer diametrical configuration which is variable over its entire periphery. Alternatively, it may be designed such that the leg portion is provided with a pair or more of oppositely expanded portions. The expanded portions may be formed with a hollow interior so that the wide diameter portion itself has a predetermined amount of elasticity. By virtue of the hollow interior of the wide diameter portion, the insertion pin 4 can be inserted into the bush 5 with a reduced amount of force.

Although the fastener 1 is used as a clip for a weather strip in the above-mentioned embodiment, it can be widely used as a general fastener by modifying the configuration of the head portion 2 of the insertion pin 4. For example, by modifying the configuration of the head portion 2 so as to have a hook-shaped configuration, it can be utilized as a fastener for wires, pipes, tubes and other rod shaped articles. Thus, the range of applications of the present invention is very large.

As described in the foregoing, according to the present invention, since the insertion pin and bush are integrally formed, no time or labor is required for assembling the insertion pin and the bush, and the manufacturing cost can be reduced.

Furthermore, since the insertion pin and bush can be simultaneously inserted into the hole simply by holding the leg portion of the insertion pin in alignment with the hole formed within the panel and inserting it therein, the assembly work becomes simplified.

Furthermore, since the outer diameter of the portion of the bush disposed beneath the flange portion is smaller than the diameter of the hole at the time of insertion, the bush can be smoothly and rapidly inserted into the hole without difficulty. In addition, the coating or the like around the hole is not scratched or peeled, which helps to prevent rusting.

Obviously, many modifications and variations of the present invention are possible in light of the above teachings. It is therefore to be understood that within the scope of the appended claims, the present invention may be practiced otherwise than as specifically described herein.

What is claimed is:

1. A fastener, comprising:
   a molded insertion pin made of a first synthetic resin material integrally provided with a head portion and a leg portion depending from said head portion; and
   a molded bush made of a second synthetic resin material, which is softer than said first synthetic resin material comprising said insertion pin, integrally provided with a cylindrical portion disposed upon an outer peripheral portion of said leg portion of said insertion pin and having an outer diameter which permits said bush to be disposed within an aperture defined within a support panel within which said fastener is to be secured, a flange portion having a diameter larger than the diameter of said aperture and disposed at an upper end of said cylindrical portion for seating upon an upper surface of said support panel, and first engagement means defined upon a lower end portion thereof,
   wherein said leg portion of said insertion pin is provided midway along the axial length thereof with second engagement means for engaging said first engaging means of said bush so as to axially fix said insertion pin at a first axial assembled position and prevent forward and backward axial movement thereof relative to and within said bush when said bush and insertion pin are initially deposite within said aperture of said support panel; a wide diameter portion for radially expanding said cylindrical portion of said bush, when said insertion pin is moved axially relative to said bush from said first axial assembled position toward a second axial assembled position, axially spaced from said first axial assembled position, so as to fixedly retain said bush within said support panel; and third engaging means, defined upon said insertion pin at a position axially spaced from said second engaging means, for engaging said first engaging means of said bush so as to fix said insertion pin at said second axial assembled position and prevent forward and backward axial movement thereof relative to and within said bush when said insertion pin is disposed at said second axial assembled position.

2. The fastener as set forth in claim 1, wherein said head portion of said insertion pin comprises:
   first flange means disposed at the uppermost end thereof for securing an article, which is to be mounted upon said support panel, to said fastener.

3. The fastener as set forth in claim 2, wherein:
   said article comprises weather-stripping.

4. The fastener as set forth in claim 2, wherein:
   said support panel comprises a door of an automotive vehicle.

5. The fastener as set forth in claim 2, wherein:
   said support panel comprises a wall of an automotive trunk.

6. The fastener as set forth in claim 2, wherein said head portion of said insertion pin further comprises:
   second flange means for engaging an upper surface of said flange portion of said bush so as to define seated support for said insertion pin upon said bush when said bush has attained said second axial assembled position.

7. A fastener as set forth in claim 6, wherein:
   said second flange means of said insertion pin is disposed at an axial position beneath said first flange means of said insertion pin;
   said wide diameter portion of said insertion pin is disposed at an axial position beneath said second flange means of said insertion pin;
   said third engaging means of said insertion pin is disposed at an axial position substantially midway along the axial length of said wide diameter portion of said insertion pin; and
   said second engaging means of said insertion pin is disposed at an axial position beneath said third engaging means of said insertion pin and upon said wide diameter portion of said insertion pin within the vicinity of the lower end portion thereof.

8. A fastener as set forth in claim 1, wherein:
said first engaging means of said bush comprises a radially inwardly annular projection.

9. A fastener as set forth in claim 1, wherein:
said second engaging means of said insertion pin comprises an annular recess defined upon an outer peripheral portion of said wide diameter portion of said leg portion of said insertion pin.

10. A fastener as set forth in claim 1, wherein:
said third engaging means of said insertion pin comprises an annular shoulder portion defined upon an outer peripheral portion of said wide diameter portion of said leg portion of said insertion pin.

11. A fastener as set forth in claim 1, wherein said cylindrical portion of said bush comprises:

an annular recessed portion disposed axially beneath said flange portion for disposition within said aperture of said support panel; and a wide diameter portion disposed axially beneath said annular recessed portion for encountering an undersurface of said support panel when said cylindrical portion of said bush is radially expanded by means of said wide diameter portion of said insertion pin.

12. A fastener as set forth in claim 1, further comprising:
slit means defined within said cylindrical portion of said bush for permitting said radial expansion of said cylindrical portion of said bush by said insertion pin.

13. A fastener as set forth in claim 1, wherein:
said bush and insertion pin comprise a two-part integrally molded fastener.

* * * * *